(12) United States Patent
Merle et al.

(10) Patent No.: US 10,323,935 B1
(45) Date of Patent: Jun. 18, 2019

(54) SYSTEM AND METHOD FOR OPTICS TESTING USING A PLANO HOLOGRAPHIC NULL INCORPORATING ALIGNMENT FEATURES

(71) Applicant: Eagle Technology, LLC, Melbourne, FL (US)

(72) Inventors: Cormic K Merle, Rochester, NY (US); Eugene G. Olczak, Pittsford, NY (US); Malcolm Nash O'Sullivan, Pittsford, NY (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 16/023,568

(22) Filed: Jun. 29, 2018

(51) Int. Cl.
*G01B 9/02* (2006.01)
*G01B 11/27* (2006.01)

(52) U.S. Cl.
CPC ........ *G01B 11/272* (2013.01); *G01B 9/02015* (2013.01)

(58) Field of Classification Search
CPC .. G01B 9/02; G01B 9/02034; G01B 9/02058; G01B 9/021; G01M 11/00; G01M 11/0207; G01M 11/0242; G01M 11/0271; G03H 1/0486
See application file for complete search history.

(56) References Cited

U.S. PATENT DOCUMENTS

| | | | |
|---|---|---|---|
| 4,848,907 A | 7/1989 | Yokokura et al. | |
| 5,737,079 A | 4/1998 | Burge et al. | |
| 7,072,042 B2 | 7/2006 | Kim et al. | |
| 7,808,646 B2 | 10/2010 | Rembe et al. | |
| 8,115,933 B2 | 2/2012 | Rembe et al. | |
| 8,482,740 B1 * | 7/2013 | Szwaykowski | G01M 11/0271 |
| | | | 356/511 |
| 8,941,837 B1 | 1/2015 | Olczak et al. | |
| 2004/0136037 A1 * | 7/2004 | Leiber | G03H 1/0236 |
| | | | 359/1 |

OTHER PUBLICATIONS

Oh et al., "Modern Technologies of Fabrication and Testing of Large Convex Secondary Mirrors", Proc. SPIE 9912, (2016)—13 pages.
Zhao et al., "Testing an Off-Axis Parabola With a CGH and a Spherical Mirror as Null Lens", Proc. SPIE 5869, (2005)—12 pages.

* cited by examiner

*Primary Examiner* — Jonathan M Hansen
(74) *Attorney, Agent, or Firm* — RatnerPrestia (57) ABSTRACT

An alignment reference module (ARM) for detecting an alignment of a hologram with respect to a spindle axis of a spindle that supports an optic device under test (DUT). The hologram is employed for testing an optical surface of the DUT. The ARM includes a flat portion having a reflective surface for reflecting light back toward the hologram member to detect tilting of the hologram relative to the spindle axis. The ARM also includes a spherical portion having a reflective surface adjacent the flat portion for transmitting light back toward the hologram member to detect a radial position of the hologram relative to the spindle axis.

20 Claims, 5 Drawing Sheets

SYSTEM AND METHOD FOR OPTICS TESTING USING A PLANO HOLOGRAPHIC NULL INCORPORATING ALIGNMENT FEATURES

BACKGROUND OF THE INVENTION (1) Field of the Invention

The present invention is directed toward a system and method for detecting the alignment of a system for performing surface measurements of an optical surface using computer generated holograms (CGHs).

(2) Description of Related Art

As is described in U.S. Pat. No. 8,941,837, which is incorporated by reference herein in its entirety, interferometry techniques are used for testing aspheric surfaces. In one test configuration, known as a null configuration, a reference wavefront and a test wavefront are formed to produce an interference pattern. Errors in the test measurement are then interpreted directly as errors in the test surface. The Hindle test is an example of a null configuration and may be used for testing convex hyperboloidal secondary mirrors. A difficulty in this approach, however, is that the auxiliary optics are often very large and difficult to fabricate.

Nulling computer generated holograms (NCGHs) have been used to measure optical surfaces or the wavefronts from the optical surfaces. The NCGHs usually include patterns of lines which act as diffraction gratings. These patterns are usually written onto, or etched into glass substrates. The NCGHs may be written with circular symmetry to preserve the rotational symmetry of most aspheric optics.

One limitation of NCGH related interferometry testing of optical surfaces is the high cost (or unavailability) of large CGHs. This is especially true for testing large convex aspheric surfaces. For that reason, the industry has adopted sub-aperture testing for large convex aspheric surfaces using a small NCGH. Alignment of an optic under test and a NCGH to the axis of rotation (spindle axis) of the optic under test can be critical in sub-aperture tests. Errors in tilt of the NCGH and centration (i.e., radial position) of the NCGH optical axis relative to the spindle axis of rotation are not discernable from conic errors in the surface under test (SUT) (i.e., the conic surface of the optic under test).

Typically, the alignment of the optic under test is not particularly challenging since, in most cases, the optic is rotationally symmetric and its optical prescription is well-centered within the outer diameter of the optic (e.g., to within a few thousands of an inch). This allows the use of simple runout measurements of the outer diameter of the optic for centering the optic to the spindle axis. Similarly, runout measurements of the optical surface can be used for leveling the optic to the spindle axis. Alignment of the NCGH, however, can be more challenging since the substrate of the NCGH is not typically rotationally symmetric nor is the holographic pattern well-centered on the substrate. For at least that reason, there exists a need to detect and correct the alignment of a NCGH with respect to the spindle axis to ensure accurate measurement of the SUT of the optic under test.

BRIEF SUMMARY OF THE INVENTION

According to one aspect of the invention, an alignment reference module (ARM) detects an alignment of a hologram with respect to a spindle axis of a spindle that supports an optic device under test (DUT). The hologram is employed for testing an optical surface of the DUT. The alignment reference module comprises a flat portion having a reflective surface for reflecting light back toward the hologram member and a spherical portion having a reflective surface adjacent the flat portion for transmitting light back toward the hologram member According to one aspect of the invention, a system for detecting an alignment of an optical system is provided. The system includes an interferometer. A spindle having a spindle axis supports an optic device under test (DUT). A hologram is positioned to face the DUT. A reference surface is disposed on the hologram or alternately a separate reference surface such as a transmission flat is positioned with respect to the hologram to form a hologram reference pair (HRP). The reference surface is configured for reflecting light back toward the interferometer. The HRP is positioned to be illuminated by the interferometer. An ARM is connected either directly or indirectly to the spindle. The ARM comprises a flat portion having a reflective surface for reflecting light back toward the interferometer and a spherical portion having a reflective surface adjacent the flat portion for reflecting light back toward the interferometer. To detect the alignment of the hologram with respect to the spindle axis, the interferometer is configured to compare (i) the reflected light from the flat portion of the ARM with light reflected from the reference surface, and (ii) the reflected light from the spherical portion of the ARM with, light reflected from the reference surface.

According to another aspect of the invention, a method for detecting an alignment of a hologram with respect to a spindle axis of a spindle that carries an optic device under test (DUT) includes the steps of:

directing an incident beam from an interferometer onto a hologram and a reference surface disposed on either the hologram or a transmission flat that is positioned with respect to the hologram;

modifying the incident beam by the reference surface to produce a reference beam and a test beam;

reflecting the reference beam from the hologram or transmission flat to the interferometer;

impinging the test beam on both a flat reflective surface and a spherical reflective surface of an alignment reference module (ARM) that is connected to the spindle and disconnected from the hologram;

reflecting the test beam from the flat reflective surface of the ARM to the interferometer;

reflecting the test beam from the spherical reflective surface of the ARM to the interferometer; and detecting the alignment of the hologram with respect to the spindle axis of the spindle using interferences between (i) the reflected light from the flat reflective surface and the reflected reference beam, and (ii) the reflected light from the spherical reflective surface and the reflected reference beam.

DETAILED DESCRIPTION OF THE INVENTION

Figure 1:
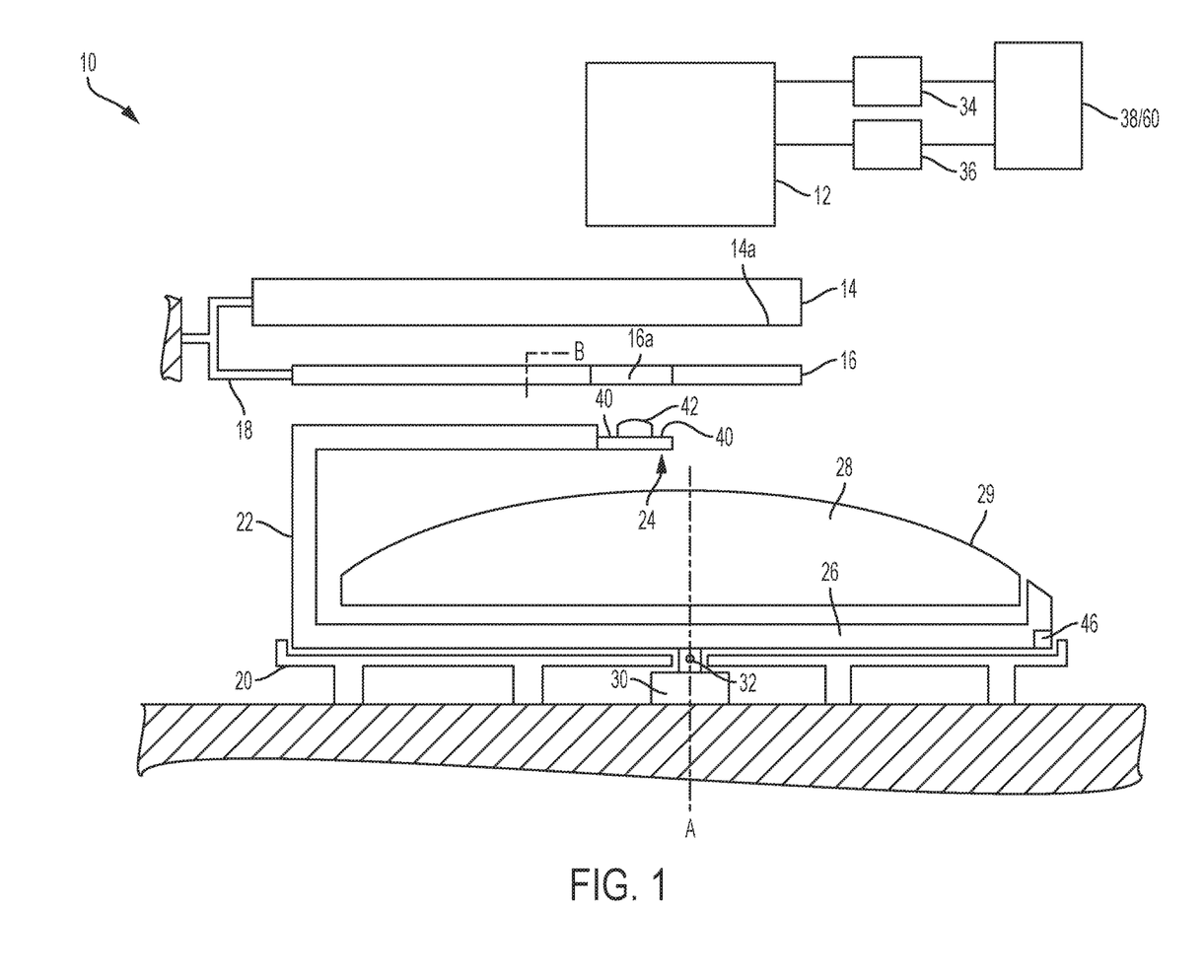
FIG. 1 depicts a block diagram illustrating an embodiment of the present invention depicting a system for wavefront measurements including an alignment reference module (ARM).

FIG. 1 depicts a block diagram illustrating an embodiment of the present invention depicting a system 10 for wavefront measurements including an alignment reference module (ARM). The system 10 generally includes an interferometer 12, a transmission flat 14 positioned beneath the interferometer 12, a null computer generated hologram (NCGH) 16 positioned beneath the transmission flat 14, a bracket 18 for fixing the NCGH 16 to the transmission flat 14, a mounting platform 20 situated on a ground surface, a rotation and/or translation spindle 26 mounted to the platform 20 and having a limb 22 to which an ARM 24 is attached, an optic device under test (DUT) 28 having a large convex surface 29 (aspheric or spheric) that is mounted to the spindle 26, and a motor 30 having an output shaft 32 for causing rotation and/or translation of the spindle 26 and the DUT 28.

Referring now to the individual components of the system 10, the interferometer 12, which includes a collimator, outputs an incident beam and gathers interferometry data using a reference beam and a test beam, as is known in the art. The interferometer 12 may be, for example, a commercial Fizeau interferometer, such as those manufactured by 4D Technologies and Zygo Inc. Yet as another example, with certain modifications to the system 10, the interferometer 12 may be configured as a Twyman-Greene interferometer. As another alternative and with certain modifications to the system 10, interferometer 12 may be configured as a wavefront sensor, such as a Shack-Hartman, Phase Diverse Phase Retrieval Sensor (non-interferometer sensing technology). As yet another alternative and with certain modifications to the system 10, interferometer 12 may be configured as an Axicon-type interferometer.

A fringe camera 34 and an alignment camera 36 record light output from the interferometer 12. The fringe camera 34 is configured to output a signal to a monitor 38 (i.e., display). The alignment camera 36 is configured to output a signal to the monitor 38. The cameras and the monitor are optional components of the system 10.

Figure 3A:
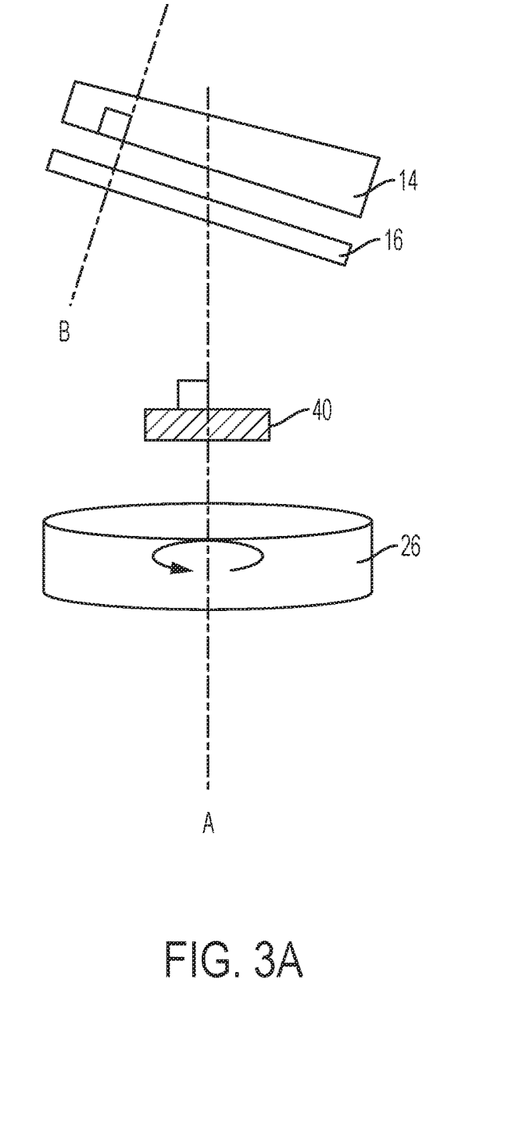
FIG. 3A depicts a flat portion of the ARM aligned to a spindle axis while the null computer generated hologram (NCGH) is tilted with respect to the spindle axis.

The transmission flat 14 is a glass article having a flat and polished bottom reference surface 14a, which faces in a direction of the ARM 24 and DUT 28. As shown in FIG. 3A, the top surface of the transmission flat 14 may be wedged at a wedge angle. The wedge angle helps reduce ghosting effects in the collimated beam. The transmission flat 14 may be omitted if the NCGH 16 includes a flat and polished bottom surface (with the exception of the area consumed by the hologram disposed on the bottom surface of the NCGH 16) and a wedged top surface. The transmission flat 14 is fixedly mounted to the NCGH 16 by a bracket 18, however, the transmission flat 14 may be directly mounted to the NCGH 16 by any mechanical feature that is known to those skilled in the art. The relative positions of the transmission flat 14 and NCGH 16 are factory set, known and predetermined.

The NCGH 16 is comprised of a substrate made of glass (for example). The bottom layer of the hologram includes a patterned layer. The patterned layer may include an etching of segments of circles, for example. The segments, or arcs of circles are of a predetermined density, typically having a spacing between adjacent segments of 1 micron to 0.1 mm.

In one example, the NCGH 16 is configured to direct a collimated wavefront onto the ARM 24 and the DUT 28. A returning wavefront from the ARM 24 or the DUT 28 may be used to provide a null wavefront. Generally, the null wavefront, also known as an aspheric wavefront is formed by a diffractive carrier. As detailed in Burge et al., Proc. of SPIE, vol. 2576, 1995, holograms are designed and manufactured with a carrier to isolate light in a desired order of diffraction, which are then passed through a spatial filter that blocks the other orders of diffraction.

The portion 16a of the NCGH 16 that resides over the ARM 24 includes holographic features that allow all of the important degrees of freedom to be measured from a relatively simple interferometric pattern.

The platform 20 is a stationary component of, the system 10 that is situated on a ground surface for supporting various components of the system 10. More particularly, the platform includes a support surface for supporting the rotation and/or translation spindle 26 and the DUT 28 mounted to the spindle 26.

The spindle 26 has spider-like interconnected limbs 22 (only one limb shown) that extends both partially across and above the DUT 28. The ARM 24 is mounted to the free end of the limb 22. The ARM 24 is not necessarily aligned with the rotational axis A (also referred to as the spindle axis A) of the DUT 28. The relative positions of the ARM 24 and the DUT 28 are determined by interferometric data collection and analysis by a computer 60 of the system 10.

As an alternative to the system shown in FIG. 1, the ARM 24 may be positioned directly on the DUT 28.

The spindle 26 is configured to rotate with respect to the platform 20, and the ARM 24 rotates along with the spindle 26. The output shaft 32 of the motor 30 is mounted to the spindle 26 for rotating and/or translating the spindle 26, which consequently rotates the DUT 28 and the ARM 24. Although only one motor 30 is shown, it should be understood that various motors may be included in the system 10 for accomplishing rotation and/or translation along or about all of the degrees of freedom of the spindle 26.

According to this exemplary embodiment, the spindle 26, ARM 24 and DUT 28 rotate together while the interferometer 12, the transmission flat 14 and the NCGH 16 remain stationary. However, according to another exemplary embodiment, ARM 24 and DUT 28 remain stationary while the spindle 26, the interferometer 12, the transmission flat 14 and the NCGH 16 rotate together to achieve substantially the same purpose, i.e., relative position between the NCGH 16 and the axis of the spindle 26/DUT 28.

Referring still to the components of the system 10, the ARM 24 comprises a substantially cylindrical flat portion 40, and a spherical portion 42 that is positioned (and, optionally, centered) on the flat portion 40. The flat portion 40 may be a flat, polished, glass surface. The flat portion 40 may be a mirror, for example. The flat portion 40 at least partially surrounds the spherical portion 42. The flat portion 40 is positioned directly beneath the portion 16a of the NCGH 16. The spherical portion 42 is (optionally) a mirror having an outer spherical surface. The spherical portion 42 is substantially smaller than the DUT 28.

Alternately the ARM 24 could be comprised of an aspheric mirror, a paraboloid for example, which could allow both tilt and decenter to be calculated from a single interference pattern. The NCGH would be designed to return a null wavefront from the asphere. The combination of coma and tilt in the return interference pattern would be used to monitor the decenter and tilt of the NCGH.

The ARM 24 is a device that is used to align the NCGH 16 to the spindle axis A to high accuracy, e.g. 1 arcsec of tilt and less than 3 um of decenter. It is possible to monitor the alignment of the NCGH 16 to the spindle axis A in situ.

Figure 2:
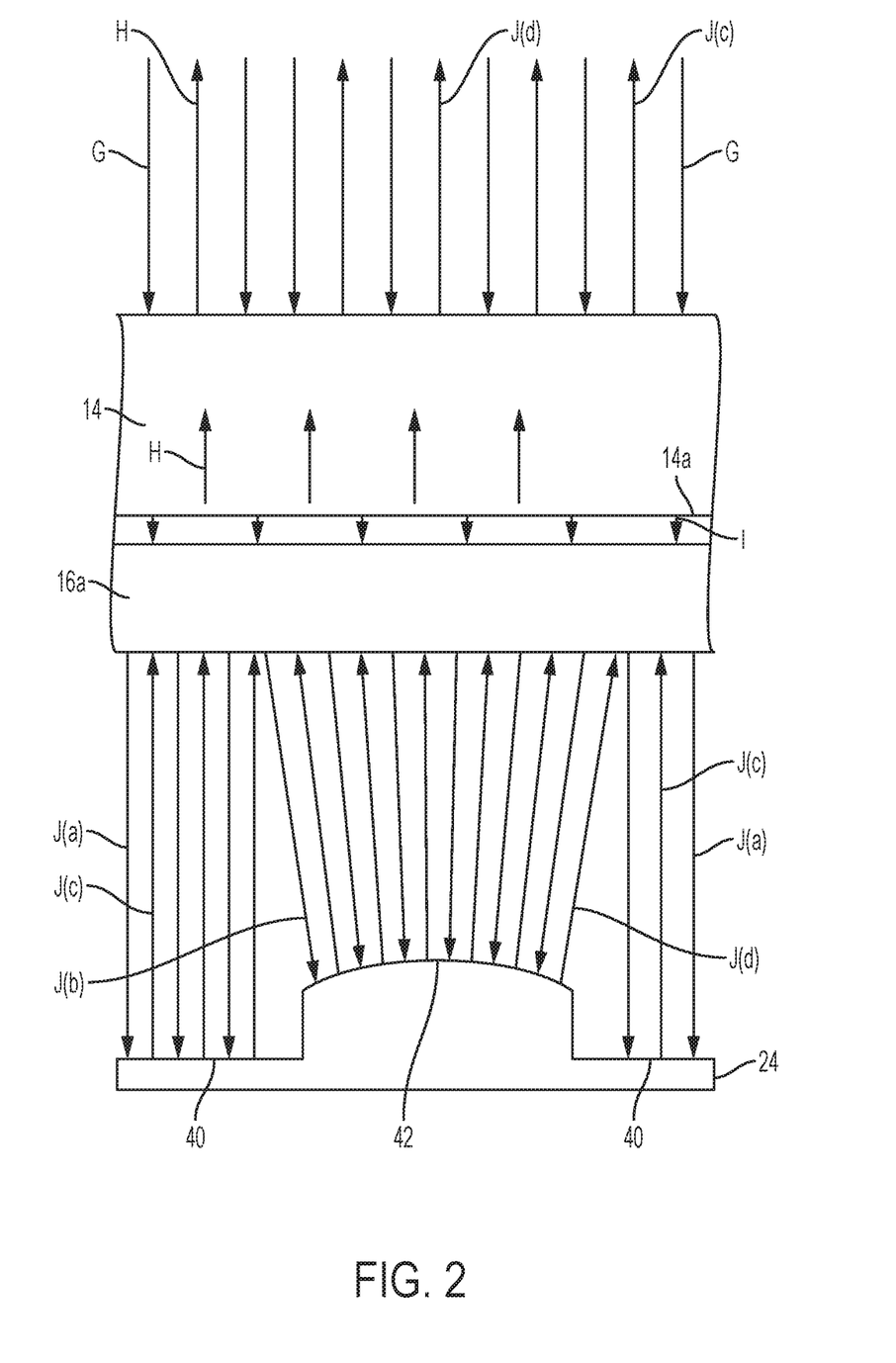
FIG. 2 depicts a schematic view of a collimated beam impacting the ARM portion of the system of FIG. 1.

Referring now to FIGS. 1 and 2, according to one method of operating the system 10 for wavefront measurements including an ARM, the collimator of the interferometer 12 outputs a collimated wavefront G toward the transmission flat 14. The transmission flat 14 forms a reference beam H and a test beam I. The reference beam H is the beam that is reflected back from the bottom polished surface of the transmission flat 14 back to the interferometer 12, whereas the test beam I is directed onto the portion 16a of the NCGH 16 residing above the ARM 24 and illuminates the portion 16a. It is noted that in a system devoid of a transmission flat 14, the reference beam is the beam that is reflected back from the bottom polished surface of the NCGH 16.

The portion 16a of the NCGH 16 then directs the test beam J. (as modified by the NCGH 16) onto both portions 40 and 42 of the ARM 24. The straight portion of the collimated test beam J that is outputted by the portion 16a of the NCGH 16 and directed onto the flat portion 40 is test beam J(a). The bent portion of the collimated test beam J that is outputted by the portion 16a of the NCGH 16 and directed onto the spherical portion 42 is test beam J(b). The test beam J(c), which is reflected by the flat portion 40, passes through the NCGH 16 and transmission flat 14. The test beam J(d), which is reflected by the spherical portion 42, passes through the NCGH 16 and the transmission flat 14. The reflected reference beam H and the test beams J(c) and J(d) share a common return path back to the interferometer 12. The reflected beams, therefore, interfere with each other and form interference fringes, thus generating test data.

Measurements of the alignment between the NCGH 16 to the spindle axis A is performed using the interference fringe data, as will be described in greater detail hereinafter.

During the above-described method, the ARM flat portion 40 is used to monitor the tip/tilt of the NCGH 16 relative to the spindle axis A. Specifically, the zero-order transmission beam 3(a) of the NCGH 16 reflects off of the ARM flat portion 40 and interferes with the reference signal beam H from the bottom reference surface 14a of the transmission flat 14. This interferometric measurement provides information on two parameters: the tilt of the ARM flat portion 40 to the spindle axis A; and the tilt of the NCGH 16 to the spindle axis A. Misalignment of the ARM flat portion 40 to the spindle axis A shows up as rotating tilt fringes on the fringe camera 34, while misalignments of the NCGH 16 to the spindle axis A will show up as static tilt fringes on the fringe camera 34.

Figure 4:
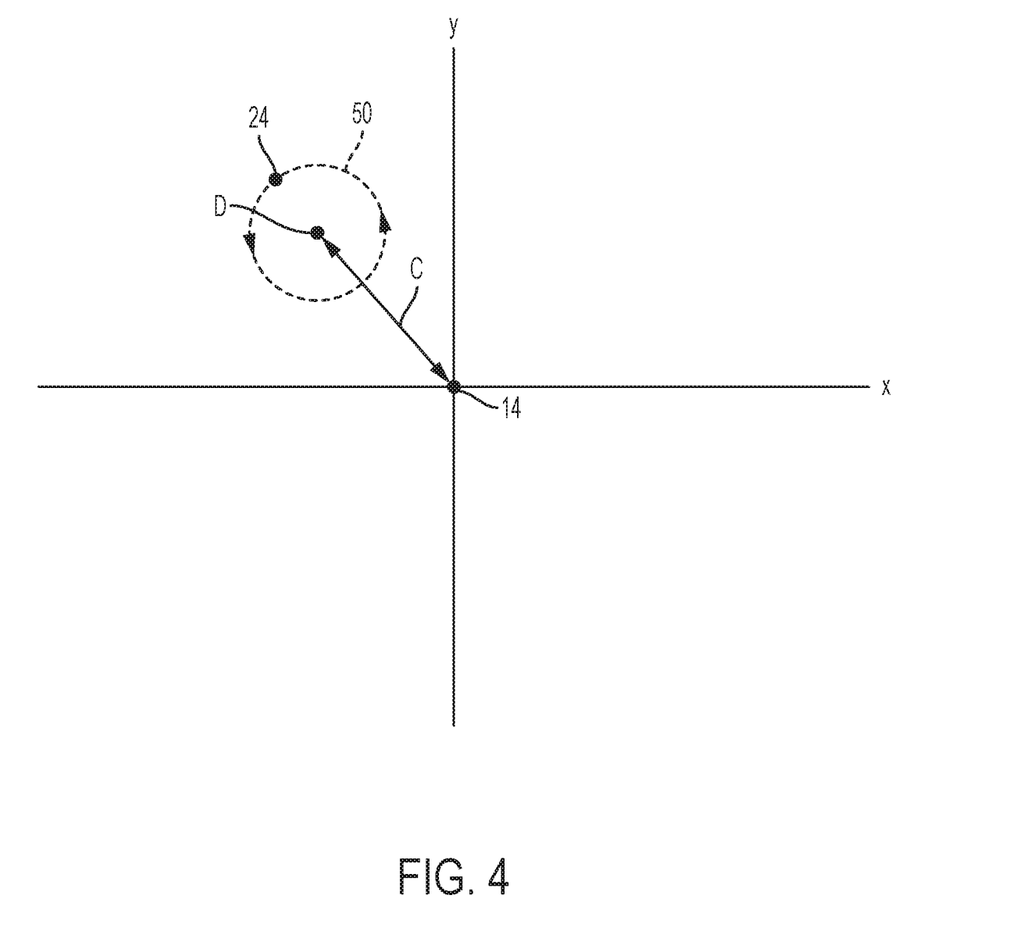
FIG. 4 depicts a display of an alignment monitor showing the misalignment of both the ARM and the NCGH with respect to the spindle axis.

As best shown in FIG. 4, misalignments of the flat portion 40 of the ARM 24 to the spindle axis A will show up on the alignment camera 36 as a procession of the ARM spot (i.e., the location of the ARM 24 designated by the dot 24) in a circle 50 having a center D. It is noted that FIG. 4 provides a simplified illustration of the ARM 24, whereas, in reality, separate dots exist for the flat portion 40 and the spherical portion 42.

Misalignments between the NCGH 16 and the spindle axis A will show up on the alignment camera 36 as an offset C between the center D of the procession and the return beam H from the bottom surface 14a of the transmission flat 14.

One goal of the system 10 is to minimize the procession of the ARM return spot 24 on the alignment monitor 38 as well as to minimize the offset C between the ARM return spot 24 and the transmission flat 14. Using the ARM flat portion 40, it is, possible to control tilt alignment of the optical axis B of the NCGH 16 to the spindle axis A to less than 1 arcsec.

During the above-described method, the ARM spherical portion 42 is used to monitor the centration (i.e., relative radial positions) of the NCGH 16 to the spindle axis A. Stated differently, the ARM spherical portion 42 is used to monitor the decenter of the NCGH optical axis B to the spindle axis A. Decenter refers to the radial misalignment between the spindle axis A and the optical axis B. The hologram at portion 16a of the NCGH 16 is designed such that the diffracted signal matches the curvature of the ARM spherical portion 42. While this may create a "dead zone" on the DUT surface, the obscuration is within the inner diameter (ID) of the clear aperture (CA) and does not impact surface evaluation. If the ID of the CA is too small, or non-existent, then this task can be accomplished with a removable ARM and an interlacing of the patterns, on the NCGH, necessary for measuring the DUT and the ARM.

Figure 3B:
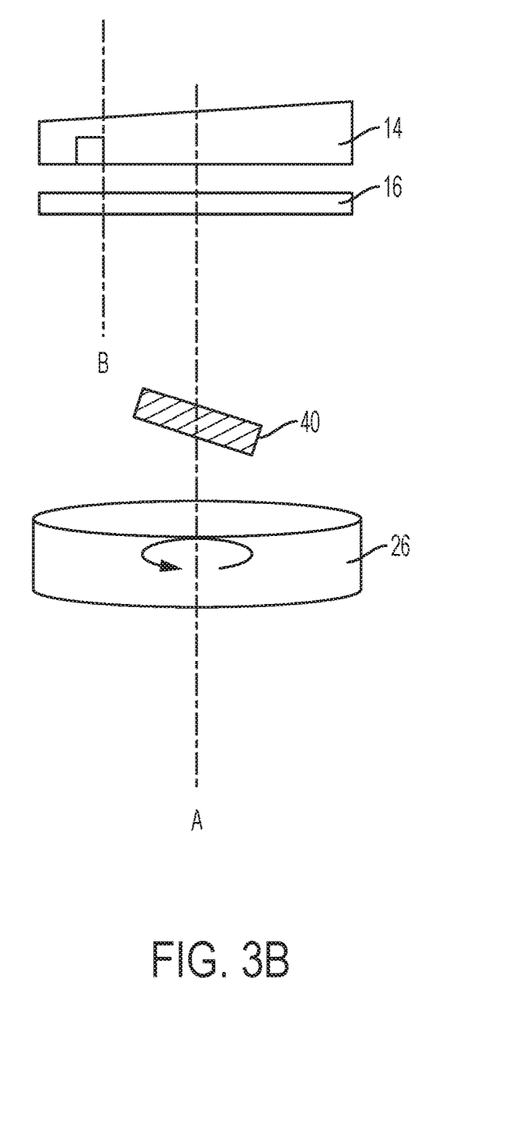
FIG. 3B depicts the flat portion of the ARM tilted with respect to the spindle axis while the NCGH is aligned with respect to the spindle axis.
Figure 3C:
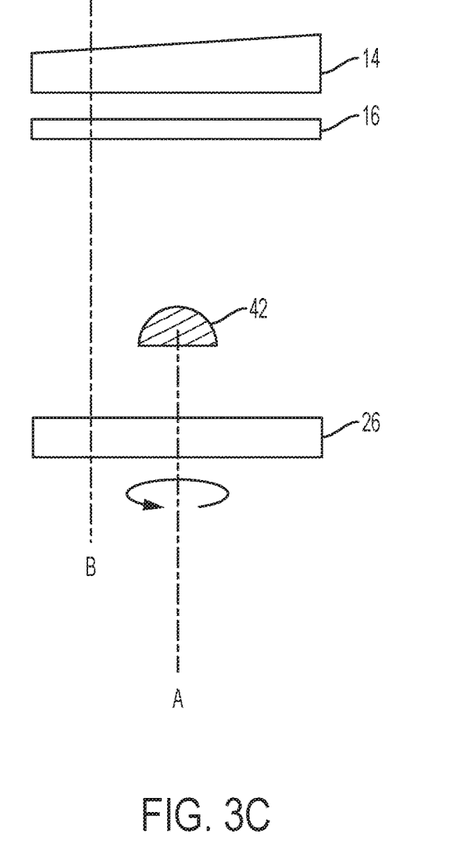
FIG. 3C depicts a spherical portion of the ARM aligned to the spindle axis while the NCGH is misaligned with respect to the spindle axis.

In this embodiment, the radius of curvature of the ARM spherical portion 42 (which may be 44.92 mm, for example) creates about 1 fringe of tilt for every 1 um of decenter relative to the ARM pattern on the NCGH 16. Like the ARM flat portion 40, there are two adjustments to be made, namely, correcting the decenter of the ARM spherical portion 42 to the spindle axis A; and correcting the decenter of the NCGH 16 to the spindle axis A. As shown in FIG. 3C, if the ARM spherical portion 42 is centered on the spindle 26 but the NCGH 16 is decentered with respect to the spindle 26, static tilt fringes will be observed on the portion 16a of the NCGH 16.

Figure 3D:
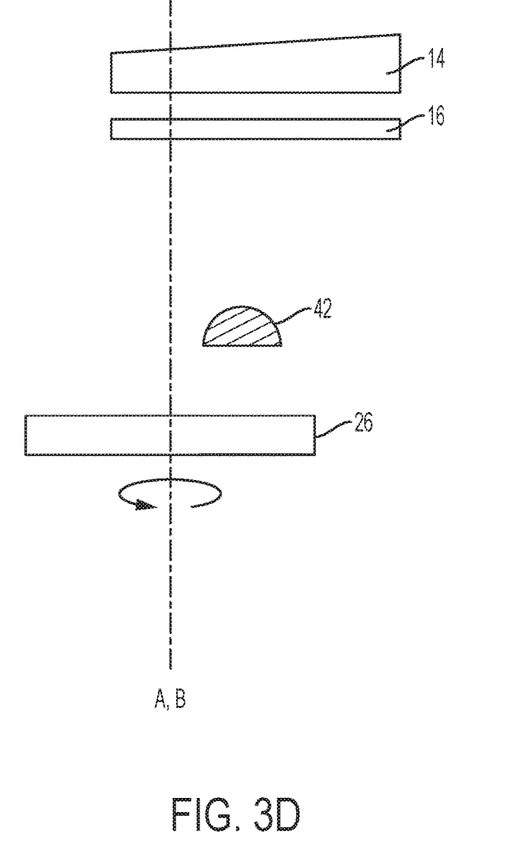
FIG. 3D depicts the NCGH aligned to the spindle axis while the spherical portion of the ARM is misaligned with respect to the spindle axis.

As shown in FIG. 3D, decenter of the ARM spherical portion 42 relative to the spindle axis A results in processing fringes with spindle rotation. On the alignment camera 36, the misalignment shows up as a processing spot (ARM spherical portion 42 to spindle decenter) and a misalignment of the center of rotation (NCGH 16 to spindle decenter). The ARM spherical portion 42 has been demonstrated to control centration alignment of the NCGH optical axis B to the spindle axis A of rotation to less than 3 um.

One goal of the system 10 is to minimize the procession of the two ARM spots on the alignment camera 36 and line up the center of spot procession with the return of the bottom reference surface 14a of the transmission flat 14. It can be helpful to allow an intentional misalignment of the flat and spherical portions of the ARM 24 to the spindle axis A to create a procession of the ARM returns on the alignment monitor 38. This allows for multiple measurements of the ARM returns as the spindle 26 rotates.

The interferometric tilts are monitored as the spindle 26 is rotated on both an alignment camera and direct interferograms. The fringe camera 34 is triggered by a signal from an encoder 46 on the spindle 26 during test. Once the fringes are observed on the ARM 16 through a full rotation, the fringe camera 34 acquires images of the ARM fringes for one full rotation of the spindle 26. Images may be collected at least every 15°, for a minimum of 24 images. The images are fed into Alignment Data Analyzer analysis software.

The software calculates the X and Y tilt of the returned wavefront for each series of interferograms. The software tracks these tilts as the spindle 26 rotates which, when plotted on an XY graph, trace a circle. This calculation is performed twice, i.e., once for the ARM flat portion 40 to monitor tilt of the NCGH 16, and once for the ARM spherical portion 42 to monitor centration of the NCGH 16. This provides a quantitative determination of the alignment similar to the qualitative results of the alignment camera.

For the ARM flat portion 40, the radius of the circle traced by the software indicates the tilt of the ARM flat portion 40. The location of the center of that circle indicates the tilt of the NCGH 16 to the spindle axis A.

For the spherical portion 42, the radius of the circle traced by the software indicates the decenter of the spherical portion 42. The location of the center of that circle indicates the decenter of the NCGH 16 to the spindle axis A.

The software calculates the location of the center of each circle and estimates its uncertainty based on the quality of the fit. Using either theoretically- or empirically-derived sensitivities in conjunction with the location of the center of the circles, the software determines the misalignment of the NCGH 16 to the spindle axis A. The alignment results outputted by the software are used to determine the required move of the NCGH 16 in tilt or decenter to achieve proper alignment of the NCGH optical axis B to the spindle axis of rotation A. A control system may be employed to adjust any misalignment of the NCGH 16 using a feedback loop.

The above described method of correcting the alignment of the NCGH 16 may be used to correct various misalignment scenarios between the NCGH 16 and the spindle axis A, which are depicted in FIGS. 3A-3D. The figures depict the impact of the different alignment states of the flat portion 40, the spherical portion 42, and the optical axis B of the NCGH 16.

More particularly, FIG. 3A depicts the flat portion 40 of the ARM 24 aligned to the spindle axis A while the NCGH 16 is tilted with respect to the spindle axis A. In this scenario, the tilt angle of the NCGH 16 remains constant while the spindle 26 rotates. FIG. 3B depicts the flat portion 40 of the ARM tilted with respect to the spindle axis A while the NCGH 16 is aligned with respect to the spindle axis A. In this scenario, the tilt angle of the NCGH 16 changes while the spindle 26 rotates.

FIG. 3C depicts the spherical portion 42 of the ARM aligned to the spindle axis while the optical axis B of the NCGH. 16 is misaligned with respect to the spindle axis A. In this scenario, the tilt angle of the NCGH 16 remains constant while the spindle 26 rotates. FIG. 3D depicts the optical axis B of the NCGH 16 aligned to the spindle axis A while the spherical portion 42 of the ARM is misaligned with respect to the spindle axis A. In this scenario, the tilt angle of the NCGH 16 changes while the spindle 26 rotates.

Although the invention is illustrated and described herein with reference to specific examples, the invention is not intended to be limited to the details shown. Rather, various modifications may be made in the details within the scope and range of equivalents of the claims and without departing from the invention.

What is claimed is:

1. An alignment reference module (ARM) for detecting an alignment of a hologram with respect to a spindle axis of a spindle that supports an optic device under test (DUT), wherein the hologram is employed for testing an optical surface of the DUT, the alignment reference module comprising a flat portion having a reflective surface for reflecting light back toward the hologram member and a spherical portion having a reflective surface adjacent the flat portion for transmitting light back toward the hologram member.

2. The ARM of claim 1, wherein the ARM forms part of a system for detecting the alignment of the hologram with respect to the spindle axis of the spindle, and the system includes the ARM, hologram and spindle, and wherein the ARM is positioned at an elevation between the DUT and the hologram.

3. The ARM of claim 2, wherein the flat portion is employed for monitoring a tilt of the hologram relative to the spindle axis.

4. The ARM of claim 2, wherein the spherical portion is employed for monitoring a radial position of the hologram relative to the spindle axis.

5. The ARM of claim 4, wherein the flat portion of the ARM is substantially cylindrical and surrounds the spherical portion.

6. The ARM of claim 2 wherein the ARM has an aspheric shape employed for monitoring the tilt and radial position of the hologram relative to the spindle axis.

7. The ARM of claim 2, wherein the flat portion and the spherical portion are combined in an asphere that is employed for monitoring both a tilt and a radial position of the hologram relative to the spindle axis.

8. A system for detecting an alignment of an optical system, said system comprising:
   an interferometer;
   a spindle that supports an optic device under test (DUT), the spindle having a spindle axis;
   a hologram positioned to face the DUT, and a reference surface disposed on either the hologram or a transmission flat that is positioned with respect to the hologram, the reference surface being configured for reflecting light back toward the interferometer, the hologram and the reference surface being positioned to be illuminated by the interferometer;
   an alignment reference module (ARM) connected either directly or indirectly to the spindle, the ARM comprising a flat portion having a reflective surface for reflecting light hack toward the interferometer and a spherical portion having a reflective surface adjacent the flat portion for reflecting light back toward the interferometer;
   wherein the interferometer is configured to compare (i) the reflected light from the flat portion of the ARM with light reflected from the reference surface, and (ii) the reflected light from the spherical portion of the ARM with light reflected from the reference surface in order to detect the alignment of the hologram with respect to the spindle axis.

9. The system of claim 8, wherein the spindle is disconnected from the hologram.

10. The system of claim 8, wherein the hologram is stationary and the spindle is configured to rotate the DUT and the ARM about the spindle axis with respect to the stationary hologram.

11. The system of claim 8, wherein the interferometer, the hologram and the reference surface are configured to rotate while the ARM and the DUT remain stationary.

12. The system of claim 8, wherein the ARM is positioned at an elevation between the DUT and the hologram.

13. The system of claim 8, wherein the reference surface is disposed on the transmission flat, and the transmission flat is positioned at an elevation between the interferometer and the hologram.

14. The system of claim 8, wherein an output of the interferometer is connected to a fringe camera and an alignment camera, and the cameras are connected to a computer for quantitative analysis of the output and a monitor for displaying interference between the reflected light from the flat portion of the ARM and the light reflected from the reference surface, as well as interference between the reflected light from the spherical portion of the ARM and the light reflected from the reference surface.

15. The system of claim 8, wherein the flat portion is employed for monitoring a tilt of the hologram relative to the spindle axis.

16. The system of claim 8, wherein the spherical portion is employed for monitoring a radial position of the hologram relative to the spindle axis.

17. The system of claim 8, wherein the flat portion and the spherical portion are combined in an asphere that is employed for monitoring both a tilt and a radial position of the hologram relative to the spindle axis.

18. A method for detecting an alignment of a hologram with respect to a spindle axis of a spindle that carries an optic device under test (DUT), the method comprising:
    directing an incident beam from an interferometer onto a hologram and a reference surface disposed on either the hologram or a transmission flat that is positioned with respect to the hologram;
    modifying the incident beam by the hologram or the transmission flat to produce a reference beam and a test beam;
    reflecting the reference beam from the reference surface to the interferometer;
    impinging the test beam on both a flat reflective surface and a spherical reflective surface of an alignment reference module (ARM) that is connected to the spindle and disconnected from the hologram;
    reflecting the test beam from the flat reflective surface of the ARM to the interferometer;
    reflecting the test beam from the spherical reflective surface of the ARM to the interferometer; and
    detecting the alignment of the hologram with respect to the spindle axis of the spindle using interferences between (i) the reflected light from the flat reflective surface and the reflected reference beam, and (ii) the reflected light from the spherical reflective surface and the reflected reference beam.

19. The method of claim 18, wherein the detecting step comprises detecting a tilt of the hologram with respect to the spindle axis of the spindle using interference between the reflected light from the flat reflective surface and the reflected reference beam.

20. The method of claim 18, wherein the detecting step comprises detecting a radial position of the hologram relative to the spindle axis using interference between the reflected light from the spherical reflective surface and the reflected reference beam.

* * * * *